United States Patent [19]
Nakata et al.

[11] Patent Number: 5,426,534
[45] Date of Patent: Jun. 20, 1995

[54] MULTIPLE-DECK MAGNETIC INFORMATION RECORDING REPRODUCER

[75] Inventors: Shingo Nakata, Kanagawa; Yoko Kamimura, Tokyo, both of Japan

[73] Assignee: Sony Corporation, Tokyo, Japan

[21] Appl. No.: 250,632

[22] Filed: May 27, 1994

Related U.S. Application Data

[63] Continuation of Ser. No. 969,637, Oct. 30, 1992, abandoned.

[30] Foreign Application Priority Data

Oct. 31, 1991 [JP] Japan .................................. 3-286388
Oct. 31, 1991 [JP] Japan .................................. 3-286391

[51] Int. Cl.$^6$ ............................................. G11B 5/86
[52] U.S. Cl. .......................................... 360/15; 360/71
[58] Field of Search .......................... 360/71, 13, 15; 358/335, 310, 311

[56] References Cited

U.S. PATENT DOCUMENTS 4,757,413  7/1988  Veigh .................... 360/137
5,055,937 10/1991  Yamada et al. ........... 358/335
5,124,807  6/1992  Dunlap et al. ........... 360/15 X

FOREIGN PATENT DOCUMENTS 0423356   3/1990  European Pat. Off. ........... 360/15
58-150106 9/1983  Japan ........................ 360/15
0080582   4/1986  Japan ........................ 360/15
0170927   8/1986  Japan ........................ 360/15
0118943   5/1990  Japan ........................ 360/14.1
9012396  10/1990  WIPO ......................... 360/15

*Primary Examiner*—Andrew L. Sniezek
*Attorney, Agent, or Firm*—Lise A. Rode; Robert P. Biddle; Jerry A. Miller

[57] ABSTRACT

A double-deck video tape recorder has two tape cassette slots defined in a front panel thereof for inserting and ejecting respective magnetic tape cassettes therethrough. The double-deck video tape recorder also has a pair of drive mechanisms disposed in a housing for recording information on and reproducing information from the magnetic tape cassettes inserted in the respective drive mechanisms through the tape cassette slots. When an edit direction key is pressed, a control system places one of the drive mechanisms in a playback mode and another of the drive mechanisms in a recording mode. When a start/pause key is pressed, the control system starts to operate the one of the drive mechanisms to reproduce recorded information from the magnetic tape cassette inserted therein and also to operate the other drive mechanism to record the reproduced information in the magnetic tape cassette inserted therein.

9 Claims, 9 Drawing Sheets

MULTIPLE-DECK MAGNETIC INFORMATION RECORDING REPRODUCER

This is a continuation of application Ser. No. 07/969,637 filed on Oct. 30, 1992 now abandoned.

BACKGROUND OF THE INVENTION

1. Field of the Invention

The present invention relates to a multiple-deck magnetic information recording and reproducing apparatus for dubbing recorded information from one magnetic recording medium to another magnetic recording medium.

2. Description of the Prior Art

There are known double-deck video tape recorders and audio tape recorders. Such a double-deck video tape recorder or audio tape recorder has two tape cassette slots defined in one housing for inserting and discharging respective magnetic recording mediums such as video tape cassettes or audio tape cassettes. In a dubbing mode, the double-deck video tape recorder or audio tape recorder operates to reproduce recorded information from one of the inserted tape cassettes while recording the reproduced information on the other inserted tape cassette.

FIG. 1 of the accompanying drawings shows the front panel, designated by the reference numeral 1, of a box-shaped housing of a conventional double-deck video tape recorder. The housing accommodates a pair of first and second drive mechanisms 13, 14 for recording information on and reproducing information from respective video tape cassettes which may be of the VHS or 8-mm format, for example. The first and second drive mechanisms 13, 14 include respective loading mechanisms for loading and unloading the magnetic tapes in the video tape cassettes. The panel 1 has a pair of juxtaposed left and right tape cassette slots 2, 3 defined therein for inserting the video tape cassettes into the respective first and second drive mechanisms 13, 14. After the video tape cassettes have been inserted into the respective first and second drive mechanisms 13, 14 through the tape cassette slots 2, 3, the magnetic tapes are pulled from the video tape cassettes and wound around respective drums in the first and second drive mechanisms 13, 14 by the loading mechanisms. Then, one of the magnetic tapes is played back, or desired information is recorded thereon. After the playback or recording mode, one or both of the video tape cassettes are ejected from one or both of the tape cassettes slots 2, 3.

The front panel 1 has a first group 4 of control keys for recording information on and reproducing information from the video tape cassette which is loaded in the first drive mechanism 13. The first group 4 of control keys is positioned on a lower left portion of the front panel 1 below the tape cassette slot 2. Similarly, the front panel 1 has a second group 5 of control keys for recording information on and reproducing information from the video tape cassette which is loaded in the second drive mechanism 14. The second group 5 of control keys is positioned on a lower right portion of the front panel 1 below the tape cassette slot 3.

When any one of the control keys of the first and second groups 4, 5 is pressed by the operator, it is illuminated by its own light source, highlighting an indicia marked thereon. The control keys of the first and second groups 4, 5 are used to record information on, reproduce information from, feed, rewind, and stop the magnetic tapes in the video tape cassettes.

More specifically, the control keys include rewind keys 6A, 6B for rewinding the magnetic tapes, playback keys 7A, 7B for reproducing information from the magnetic tapes, fast-forward keys 8A, 8B for feeding the magnetic tapes quickly, pause keys 9A, 9B for temporarily stopping the magnetic tapes, stop keys 10A, 10B for stopping the magnetic tapes, and record keys 11A, 11B for recording information on the magnetic tapes.

The front panel 1 also has eject keys 12A, 12B positioned respectively above the tape cassette slots 2, 3 for ejecting the video tape cassettes from the first and second drive mechanisms 13, 14 through the respective tape cassette slots 2, 3.

A dubbing mode for copying recorded information from one of the inserted video tape cassettes to the other video tape cassette is carried out according to the following procedure:

It is assumed that both the first and second drive mechanisms 13, 14 are capable of recording information on and reproducing information from VHS-format video tape cassettes.

First, a recorded video tape cassette is inserted into the first drive mechanism 13 through the tape cassette slot 2, and a video tape cassette, which is preferably unrecorded, is inserted into the second drive mechanism 14 through the tape cassette slot 3. The video tape cassettes inserted into the first and second drive mechanisms 13, 14 through the tape cassette slots 2, 3 will be referred to as video tape cassettes A, B, respectively.

After the magnetic tapes in the inserted video tape cassettes have been loaded, the rewind key 6A is pressed to rewind the magnetic tape in the video tape cassette A until a start position on the magnetic tape in the video tape cassette B is reached.

The rewind key 6B is also pressed to rewind the magnetic tape in the video tape cassette B until a start position on the magnetic tape in the video tape cassette B is reached.

Then, if desired information is to be dubbed to the video tape cassette B, an input source setting is switched from the video tape cassette B to the VTR 1. Such an input source setting is achieved by an input source selector key which is usually located not on the front panel 1, but on a rear, side, or lower panel of the housing.

Thereafter, the playback key 7A is pressed to start reproducing recorded information from the video tape cassette A in the first drive mechanism 13.

The record key 11B is also pressed to start recording the information that is being reproduced from the video tape cassette A, on the magnetic tape in the video tape cassette B from the start position thereon.

As described above, it is necessary to press at least five keys to perform the dubbing mode. After the dubbing mode, the stop keys 10A, 10B are pressed stop the magnetic tapes in the video tape cassettes A, B, and then the eject keys 12A, 12B are pressed to eject the video tape cassettes A, B from the first and second tape cassette slots 2, 3, respectively.

However, inasmuch as the conventional double-deck video tape recorders and audio tape recorders have required many control keys on the front panel, the operator has found it quite cumbersome to operate on the control keys, and the double-deck tape recorders are relatively expensive to manufacture.

OBJECTS AND SUMMARY OF THE INVENTION

It is therefore an object of the present invention to provide a multiple-deck magnetic information recording and reproducing apparatus which is capable of dubbing recorded information from one magnetic tape to another magnetic tape in a simple procedure.

According to the present invention, there is provided a multiple-deck magnetic information recording and reproducing apparatus comprising a housing having a plurality of slots for inserting and ejecting respective magnetic recording mediums therethrough, a plurality of drive mechanisms disposed in the housing for recording information on and reproducing information from the magnetic recording mediums inserted in the respective drive mechanisms through the slots, and control means for placing one of the drive mechanisms in a playback mode and another of the drive mechanisms in a recording mode in response to an input signal from a first control key, and for starting to operate the one drive mechanism to reproduce recorded information from the magnetic recording medium inserted therein and to operate the other drive mechanism to record the reproduced information on the magnetic recording medium inserted therein, in response to an input signal from a second control key.

According to the present invention, there is also provided a multiple-deck magnetic information recording and reproducing apparatus comprising a housing having a plurality of slots for inserting and ejecting respective magnetic recording mediums therethrough, a plurality of drive mechanisms disposed in the housing for recording information on and reproducing information from the magnetic recording mediums inserted in the respective drive mechanisms through the slots, and control means for selecting one of the drive mechanisms in response to an input signal from a first control key and selecting another of the drive mechanisms in response to an input signal from a second control key, for placing the selected one drive mechanism in a playback mode in response to an input signal from a third control key and placing the selected other drive mechanism in a recording mode in response to an input signal from a fourth control key, and for starting to operate the one drive mechanism to reproduce recorded information from the magnetic recording medium inserted therein and to operate the other drive mechanism to record the reproduced information on the magnetic recording medium inserted therein, in response to an input signal from a fifth control key.

The control means may include means for returning the magnetic recording mediums inserted in the one and other drive mechanisms back to start positions thereof before the one and other drive mechanisms start to operate.

The control means may include means for starting to operate the one drive mechanism a predetermined period of time after the other drive mechanism starts operating.

The magnetic recording mediums comprise magnetic tape cassettes.

The above and other objects, features, and advantages of the present invention will become apparent from the following description of illustrative embodiments thereof to be read in conjunction with the accompanying drawings, in which like reference numerals represent the same or similar objects.

DETAILED DESCRIPTION OF THE PREFERRED EMBODIMENTS

According to an embodiment of the present invention, the principles of the present invention are incorporated in a double-deck video tape recorder. The double-deck video tape recorder may be arranged to use two video tape cassettes of one format or different formats, e.g., two VHS-format video tape cassettes, or two 8 mm-format video tape cassettes, or one VHS-format video tape cassette and one 8 mm-format video tape cassette.

Figure 2:
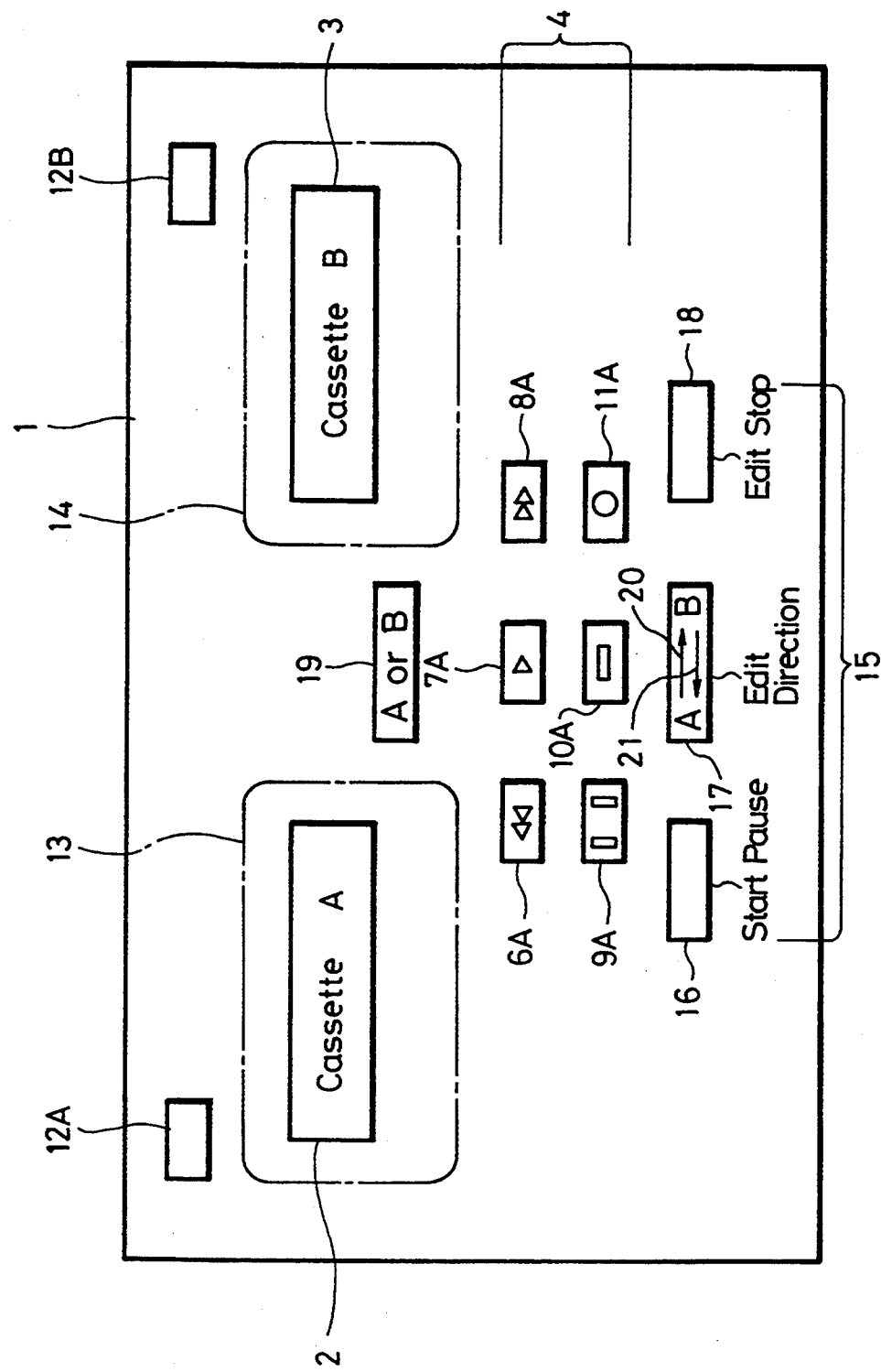
FIG. 2 is a front elevational view of the front panel of a double-deck video tape recorder according to the present invention.

As shown in FIG. 2, the double-deck video tape recorder has a housing including a front panel 1. The housing accommodates a pair of first and second drive mechanisms 13, 14 for recording information on and reproducing information from respective video tape cassettes. The first and second drive mechanisms 13, 14 include respective loading mechanisms for loading and unloading the magnetic tapes in the video tape cassettes. The panel 1 has a pair of juxtaposed left and right tape cassette slots 2, 3 defined therein for inserting the video tape cassettes into the respective first and second drive mechanisms 13, 14. After the video tape cassettes have been inserted into the respective first and second drive mechanisms 13, 14 through the tape cassette slots 2, 3, the magnetic tapes are pulled from the video tape cassettes and wound around respective drums in the first and second drive mechanisms 13, 14 by the loading mechanisms. Then, one of the magnetic tapes is played back, or desired information is recorded thereon. After the playback or recording mode, one or both of the video tape cassettes are ejected from one or both of the tape cassettes slots 2, 3.

The video tape cassettes inserted into the drive mechanisms 13, 14 through the tape cassette slots 2, 3 will be referred to as video tape cassettes A, B, respectively. The drive mechanisms 13, 14 may also be referred to as VTRs 1 and 2, respectively.

The first and second drive mechanisms 13, 14 also include recording and reproducing systems and servo control systems (not shown).

The front panel 1 has a selector key 19 positioned centrally thereon for selecting one, at a time, of the first and second drive mechanisms 13, 14 for operation in various modes including playback and recording modes. When the selector key 19 is pressed once, the first drive mechanism 13 is selected, and the selector key 19 is illuminated by its own light source to highlight a letter "A" marked thereon. When the selector key 19 is pressed twice, the second drive mechanism 14 is selected, and the selector key 19 is illuminated by its own light source to highlight a letter "B" marked thereon. Therefore, the letters "A" and "B" on the selector key 19 are alternately highlighted each time the selector key 19 is pressed.

Figure 1:
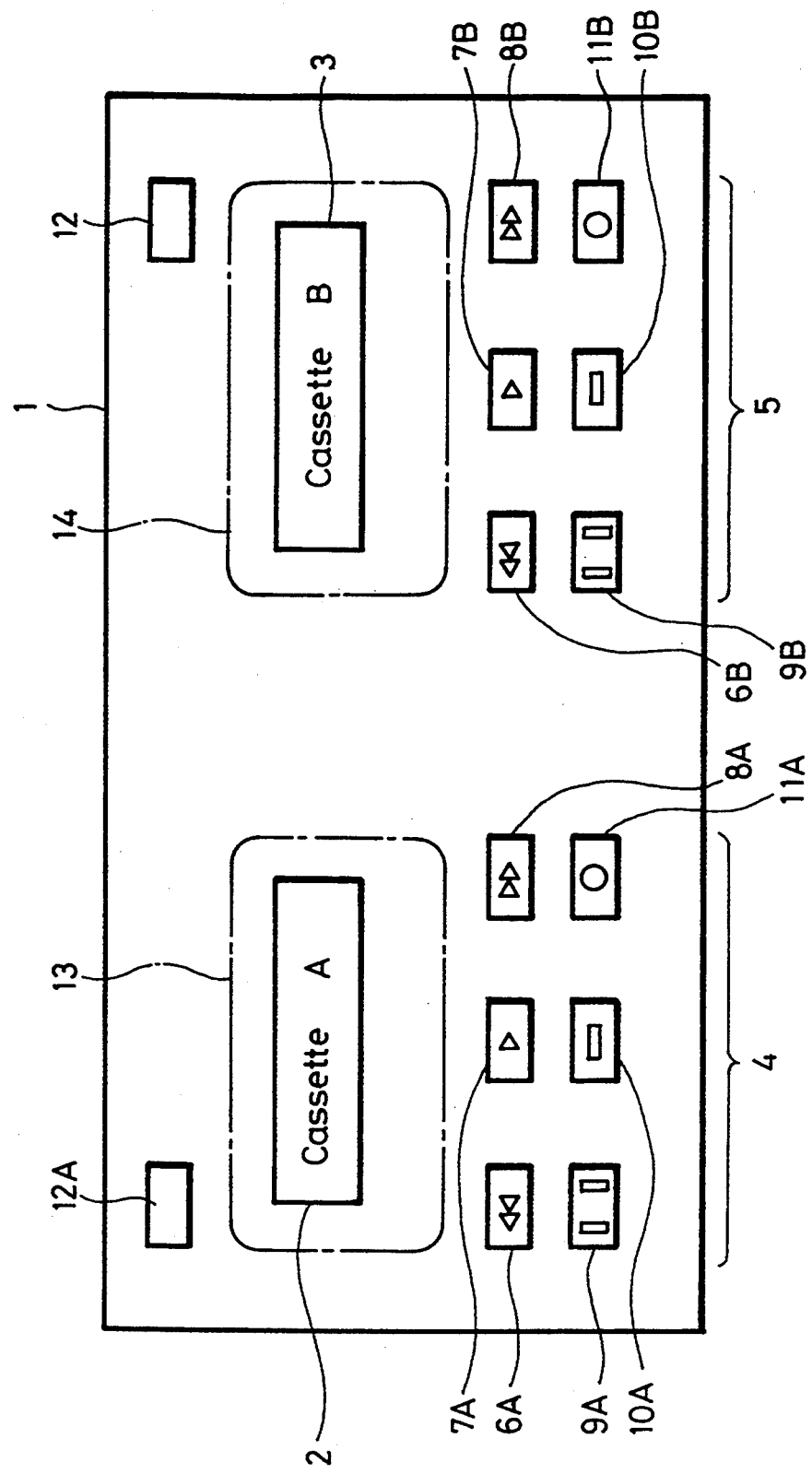
FIG. 1 is a front elevational view of the front panel of a conventional double-deck video tape recorder.

The front panel 1 also has a first group 4 of control keys positioned below the selector key 19 which are shared to operate the first and second drive mechanisms 13, 14. As with the control keys of the first and second groups 4, 5 shown in FIG. 1, the control keys of the first group 4 include a rewind key 6A, a playback key 7A, a fast-forward key 8A, a pause key 9A, a stop key 10A, and a record key 11A.

Beneath the first group 4 of control keys, there is disposed a second group 15 of dubbing keys which include an edit direction key 17 for indicating the direction in which recorded information is edited, i.e., dubbed, a start/pause key 16 for starting or pausing a dubbing process, and an edit stop key 18 for stopping a dubbing process. The second group 15 of dubbing keys is used to operate the double-deck magnetic tape recorder in an edit mode, i.e., a dubbing mode.

The edit direction key 17 bears two letters "A", "B" and two parallel right and left arrows 20, 21 therebetween. The letter "A" on the edit direction key 17 indicates the cassette A inserted into the VTR 1 through the tape cassette slot 2, and the letter "B" on the edit direction key 17 indicates the cassette B inserted into the VTR 2 through the tape cassette slot 3. The right arrow 20 indicates a direction from the cassette A to the cassette B, and the right arrow 21 indicates a direction from the cassette B to the cassette A.

Figure 3:
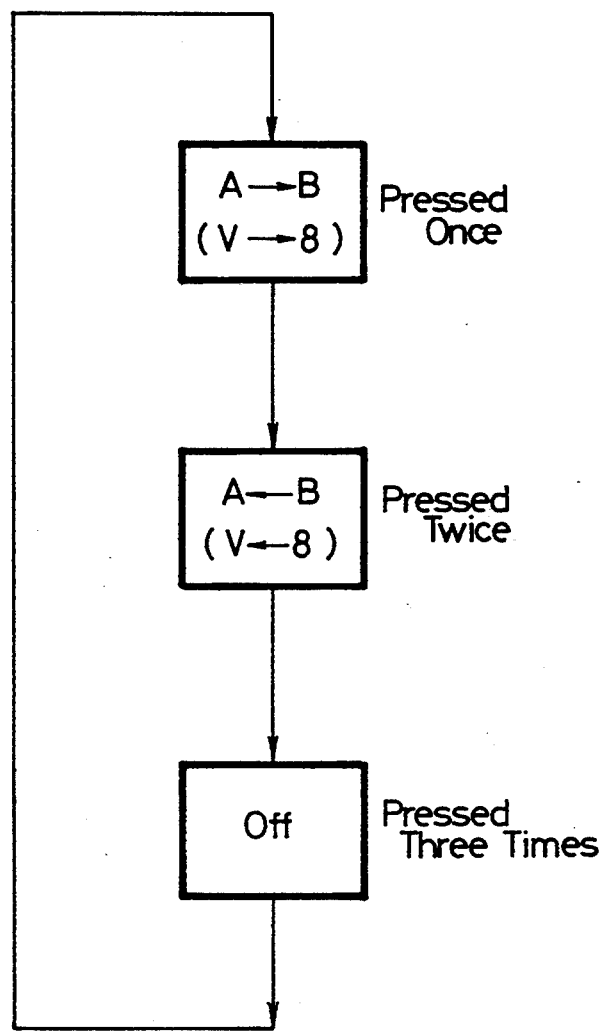
FIG. 3 is a flowchart of an operation sequence of an edit direction key of the double-deck video tape recorder.

When the edit direction key 17 is pressed, it is illuminated by its own light source to highlight the combination of the letters "A", "B" and the right arrow 20, i.e., "A→B", or the combination of the letters "A", "B" and the left arrow 21, i.e., "A←B". For example, when the edit direction key 17 is pressed once, the combination "A→B" is highlighted, as shown in FIG. 3, indicating a dubbing direction from the tape cassette A to the cassette B, and the cassette A in the first drive mechanism 13 is placed in a playback mode and the cassette B in the second drive mechanism 14 in a recording mode. When the edit direction key 17 is pressed twice, the combination "A←B" is highlighted, as shown in FIG. 3, indicating a dubbing direction from the cassette B to the cassette A, and the cassette B in the second drive mechanism 14 is placed in a playback mode and the cassette A in the first drive mechanism 13 in a recording mode.

When the edit direction key 17 is pressed three times, it is turned off, as shown in FIG. 3, disabling its operation to indicate a dubbing direction.

If the double-deck magnetic tape recorder is of the type which uses a VHS-format video tape cassette in the VTR 1 and a 8 mm-format video tape cassette in the VTR 2, then the letters "A", "B" on the edit direction key 17 may be replaced with "V", "8", respectively, for example. In such a modification, when the edit direction key 17 is pressed once, the combination "V→8" is highlighted, as shown in FIG. 3, indicating a dubbing direction from a VHS-format tape cassette to an 8 mm-format tape cassette. When the edit direction key 17 is pressed twice, the combination "V←8" is highlighted, as shown in FIG. 3, indicating a dubbing direction from an 8 mm-format tape cassette to a VHS-format tape cassette. Of course, if the double-deck magnetic tape recorder is of the type which uses an 8 mm-format video tape cassette in the VTR 1 and a VHS-format video tape cassette in the VTR 2, the letters "A", "B" on the edit direction key 17 may be replaced with "8", "V", respectively.

In FIG. 2, the start/pause key 16 is used to start or interrupt a dubbing mode of operation of the double-deck magnetic tape recorder. When the start/pause key 16 is pressed once, the cassettes A, B inserted in the first and second drive mechanisms 13, 14 are played back and recorded, and recorded material is dubbed from one of the cassettes A, B to the other in the dubbing mode. When the start/pause key 16 is pressed twice, the dubbing mode is stopped temporarily. The start/pause key 16 may be illuminated by its own light source when pressed.

The edit stop key 18 is used to stop the dubbing mode completely. The edit stop key 18 may be illuminated by its own light source when pressed.

The front panel 1 also has eject keys 12A, 12B positioned respectively above the tape cassette slots 2, 3 for ejecting the cassettes A, B from the first and second drive mechanisms 13, 14 through the respective tape cassette slots 2, 3.

Figure 4:
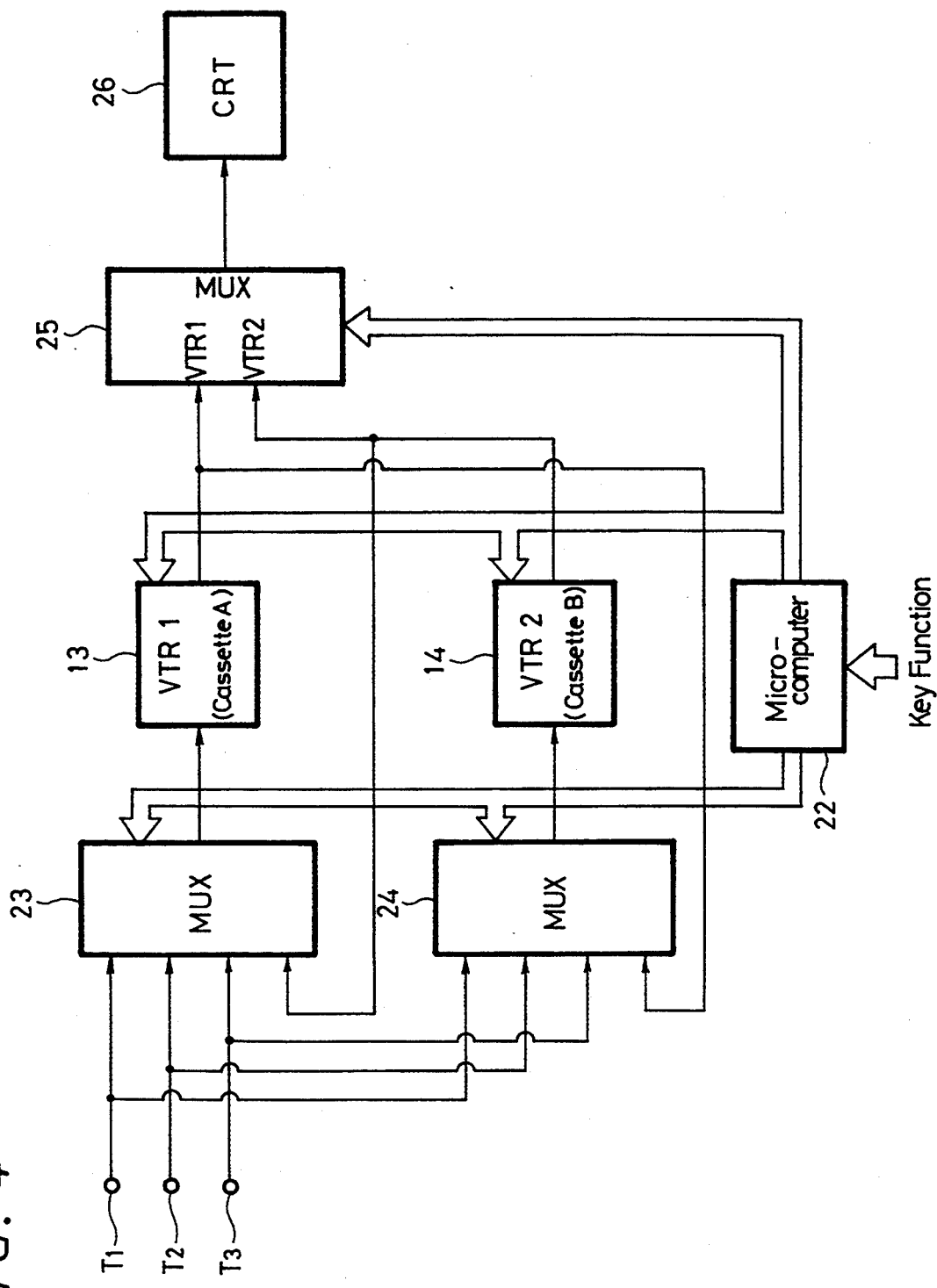
FIG. 4 is a block diagram of a control system of the double-deck video tape recorder according to the present invention.

The various operations of the double-deck magnetic tape recorder which are initiated by the selector key 19 and the control keys of the first and second groups 4, 15 are controlled by a microcomputer 22 in a control system shown in FIG. 4.

In FIG. 4, the cassettes A, B are inserted in the respective first and second drive mechanisms 13, 14, i.e., the VTRs 1, 2. It is assumed that information recorded in the cassette A is to be dubbed to the cassette B.

The control system has input terminals $T_1$, $T_2$, $T_3$ for receiving input signals from a tuner (TUNER), a broadcasting satellite (BS), and a line (LINE), respectively. The input signals from the input terminals $T_1$, $T_2$, $T_3$ are supplied parallel to both first and second multiplexers 23, 24. The first multiplexer 23 is also supplied with an output signal from the VTR 2, and the second multiplexer 24 is also supplied with an output signal from the VTR 1. The first and second multiplexers 23, 24 select one of the supplied signals under the control of the microcomputer 22, and supply the selected signal to the VTRs 1, 2, respectively.

The output signals from the VTRs 1, 2 are applied selectively through an output multiplexer 25 to a display monitor 26 such as a CRT. The VTRs 13, 14 and the output multiplexer 25 are controlled by the microcomputer 22. The microcomputer 22 is supplied with key function input signals from the control keys of the first and second groups 4, 15, the eject keys 12A, 12B, and the selector key 19.

Figure 5:
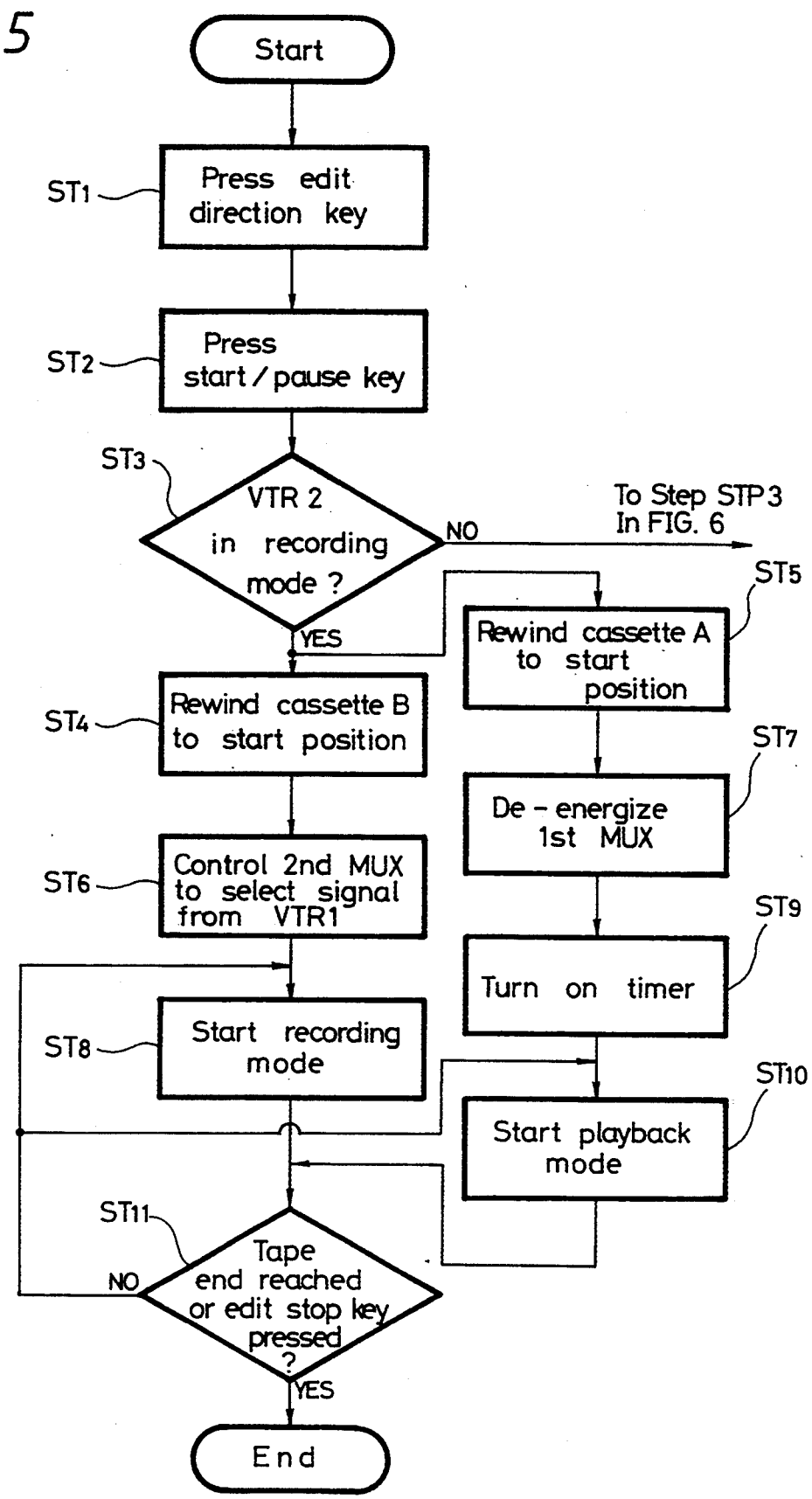
FIGS. 5 and 6 are flowcharts of operation sequences of the double-deck video tape recorder according to an embodiment of the present invention.

Operation of the double-deck magnetic tape recorder in a dubbing mode will be described below with reference to FIGS. 5 and 6. FIG. 5 shows an operation sequence for dubbing recorded information from a tape cassette of one format to a tape cassette of another format, e.g., from a recorded cassette A of the 8 mm format to a cassette B of the VHS format.

First, the edit direction key 17 is pressed once in a step $ST_1$ to place the VTR 1 in the playback mode and the VTR 2 in the recording mode.

Then, the start/pause key 16 is pressed once to start controlling the VTR 1 in the playback mode and the VTR 2 in the recording mode in a step $ST_2$.

After the step $ST_2$, the microcomputer 22 determines whether the VTR 2 is in the recording mode or not, based on a key function signal from the edit direction key 17 in a step $ST_3$. If the VTR 2 is in the recording mode, the microcomputer 22 controls the VTR 2 to rewind the cassette B back to its start position in a step $ST_4$ and also controls the VTR 1 to rewind the cassette A back to its start position in a step $ST_5$. If the VTR 2 is not in the recording mode in the step $ST_3$, then control goes from the step $ST_3$ to a step $STP_3$ (described later on) shown in FIG. 6.

In a step $ST_6$, the microcomputer 22 controls the second multiplexer 24 to select an output signal from the VTR 1. At the same time, the microcomputer 22 controls the output multiplexer 25 to select an output signal from the VTR 2 for supply to the display monitor 26.

In a step $ST_7$, the microcomputer 22 de-energizes the first multiplexer 23 to turn off any input signal supplied to the VTR 1. Since the output multiplexer 25 has not selected the output signal from the VTR 1, the output signal from the VTR 1 is supplied only to the second multiplexer 24.

Then, the microcomputer 22 starts operating the VTR 2 in the recording mode in a step $ST_8$. At the same time, the microcomputer 22 turns on a timer to count preset several seconds in a step $ST_9$. After the preset several seconds have been counted in the step $ST_9$, the microcomputer 22 starts operating the VTR 1 in the playback mode in a step $ST_{10}$. Therefore, in the steps $ST_8$, $ST_9$, $ST_{10}$, the microcomputer 22 begins to operate the VTR 2 in the recording mode several seconds earlier than it begins to operate the VTR 1 in the playback mode. Such a time delay between the recording and playback modes is inserted in order to copy recorded information from the start position of the cassette A, and in view of the length of a leader tape of the cassette B.

Now, recorded information is dubbed from the cassette A in the VTR 1 to the cassette B in the VTR 2.

After the desired information has been dubbed, the microcomputer 22 determines in a step $ST_{11}$ whether a tape end signal from the cassette A in the playback mode is detected or not, or whether the edit stop key 18 is pressed or not. If a tape end signal is detected or the edit stop key 18 is pressed, then the microcomputer 22 stops operating the VTRs 1, 2. If no tape end signal is detected or the edit stop key 18 is not pressed, then the microcomputer 22 continuously operates the VTRs 1, 2 in the playback and recording modes, respectively.

In the operation sequence shown in FIG. 5, the cassette A is in the playback mode and the cassette B is in the recording mode. FIG. 6 shows an operation sequence for dubbing recorded information from the cassette B to the cassette A when the edit direction key 17 is pressed twice.

Figure 6:
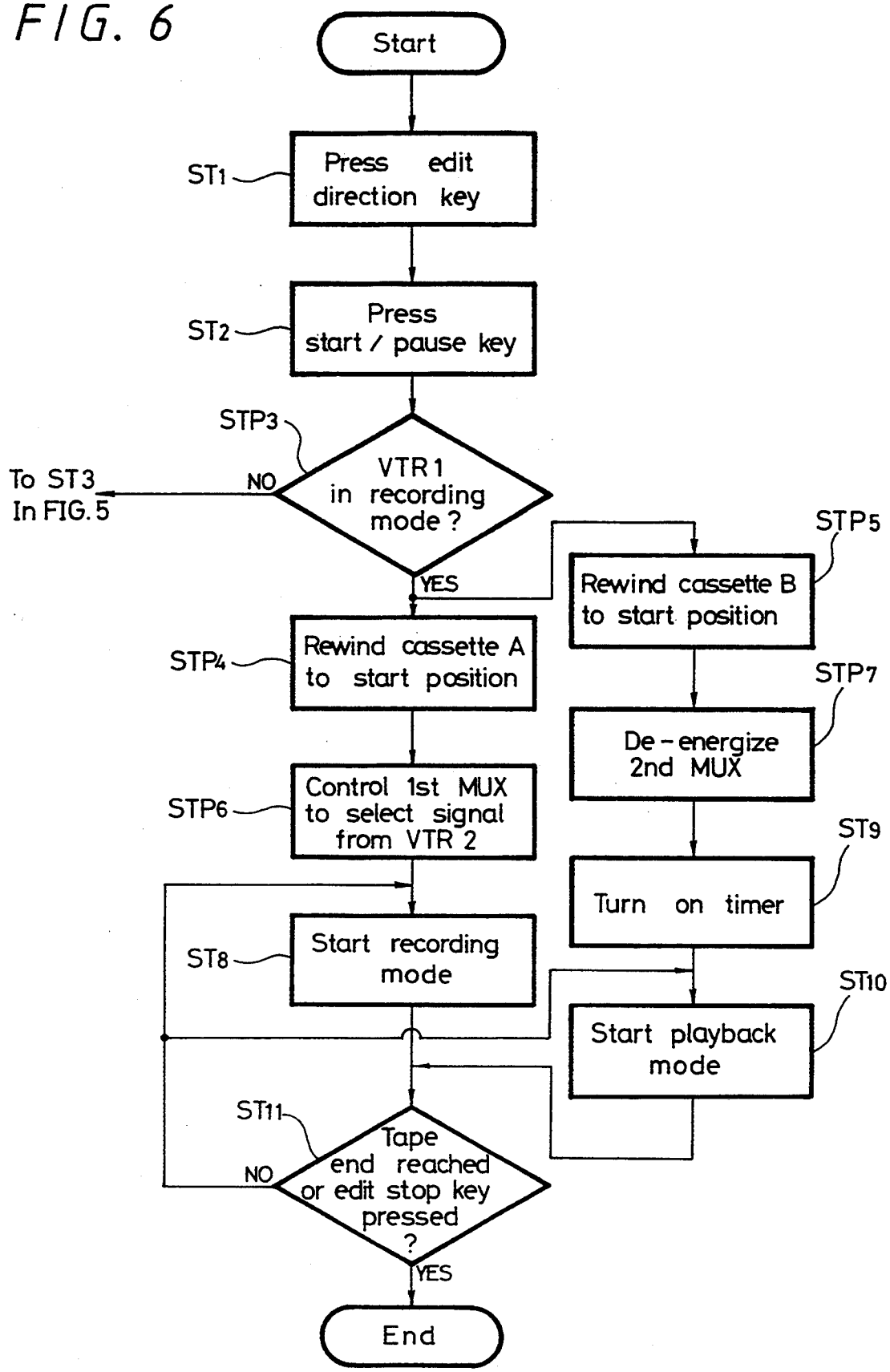

The operation sequence shown in FIG. 6 includes steps $ST_1$, $ST_2$, $ST_8$, $ST_9$, $ST_{10}$, $ST_{11}$ which are identical to the corresponding steps shown in FIG. 4. Therefore, only other steps than those steps in FIG. 6 will be described below.

After the step $ST_2$, the microcomputer 22 determines whether the VTR 1 is in the recording mode or not, based on a key function signal from the edit direction key 17 in a step $STP_3$. If the VTR 1 is in the recording mode, the microcomputer 22 controls the VTR 1 to rewind the cassette A back to its start position in a step $STP_4$ and also controls the VTR 2 to rewind the cassette B back to its start position in a step $STP_5$. If the VTR 1 is not in the recording mode in the step $STP_3$, then control goes from the step $STP_3$ to the step $ST_3$ shown in FIG. 5.

In a step $STP_6$, the microcomputer 22 controls the first multiplexer 23 to select an output signal from the VTR 2. At the same time, the microcomputer 22 controls the output multiplexer 25 to select an output signal from the VTR 1 for supply to the display monitor 26.

In a step $STP_7$, the microcomputer 22 de-energizes the second multiplexer 24 to turn off any input signal supplied to the VTR 2. Since the output multiplexer 25 has not selected the output signal from the VTR 2, the output signal from the VTR 2 is supplied only to the first multiplexer 23.

Figure 7:
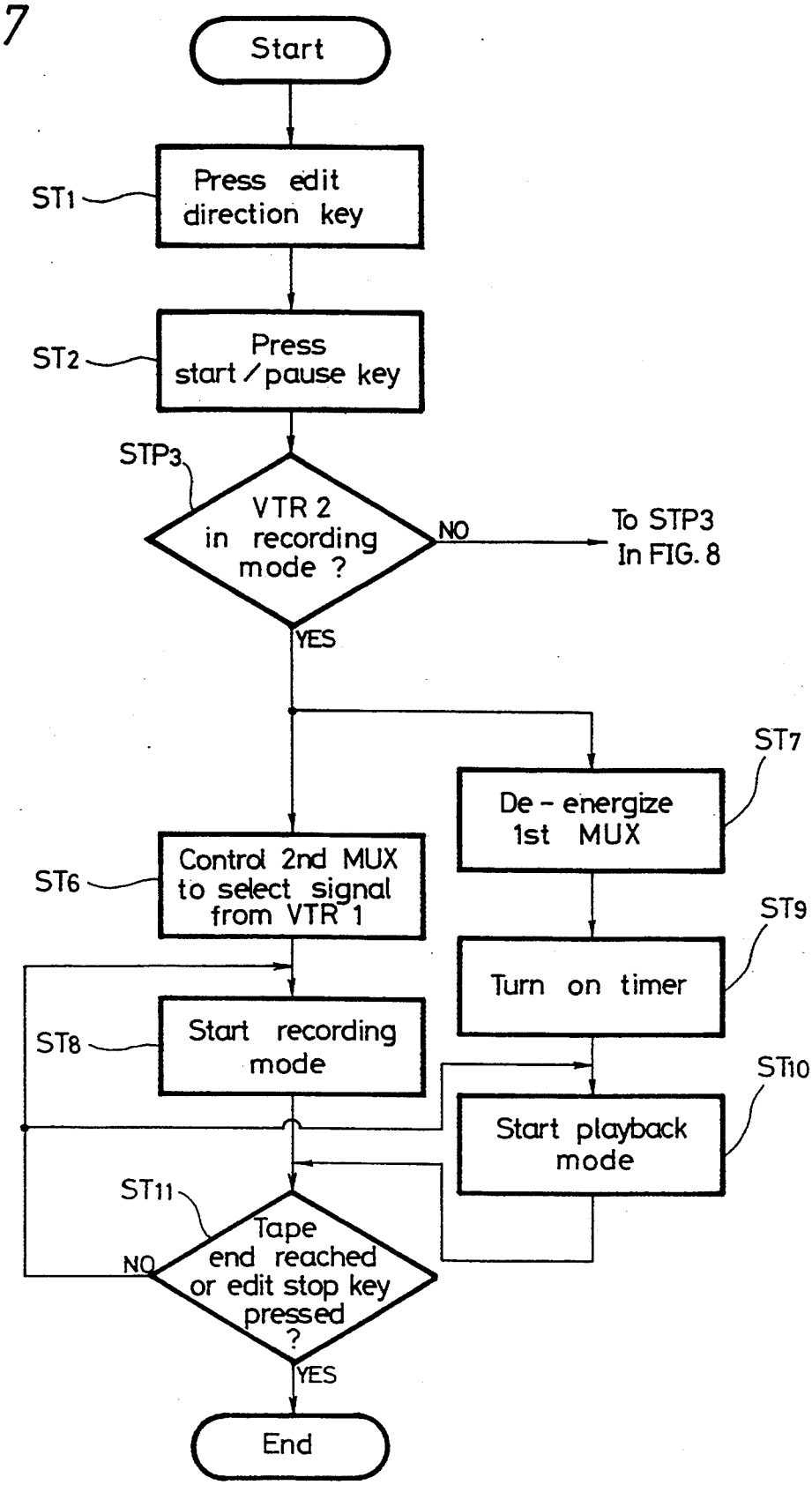
FIGS. 7 and 8 are flowcharts of operation sequences of the double-deck video tape recorder according to another embodiment of the present invention.
Figure 8:
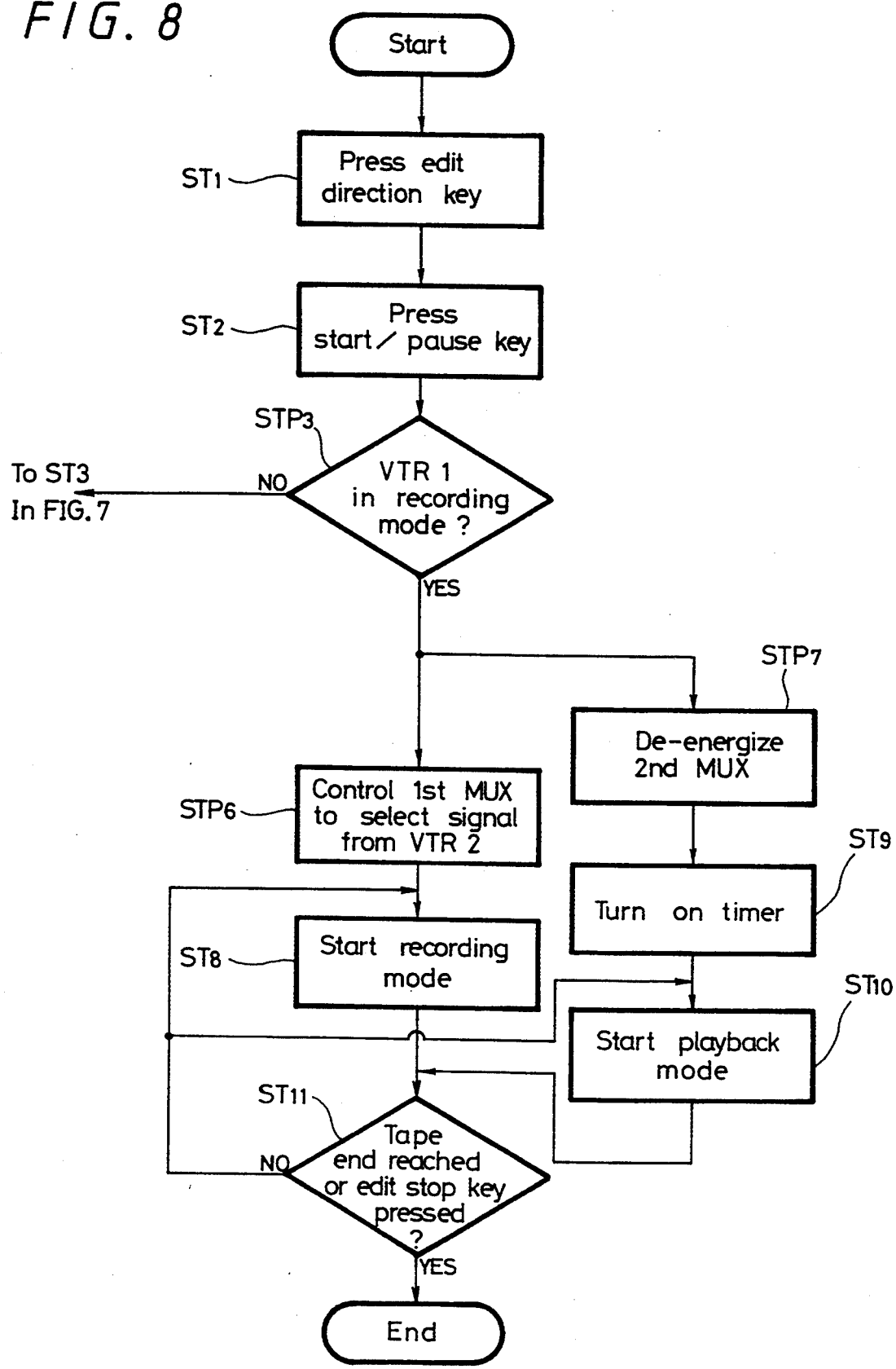

FIGS. 7 and 8 shows operation sequences of the double-deck video tape recorder according to another embodiment of the present invention. The operation sequences shown in FIGS. 7 and 8 are essentially the same as those shown in FIGS. 5 and 6, respectively, except that the steps $ST_4$, $ST_5$ in the operation sequence shown in FIG. 5 are omitted from the operation sequence shown in FIG. 7, and the steps $STP_4$, $STP_5$ in the operation sequence shown in FIG. 6 are omitted from the operation sequence shown in FIG. 8.

Therefore, in the operation sequence shown in FIG. 7, if the VTR 2 is in the recording mode in the step $ST_3$, then control goes from the step $ST_3$ to the step $ST_6$ in which the microcomputer 22 controls the second multiplexer 24 to select an output signal from the VTR 1. At the same time, the microcomputer 22 controls the output multiplexer 25 to select an output signal from the VTR 2 for supply to the display monitor 26. Control also goes from the step $ST_3$ to the step $ST_7$ in which the microcomputer 22 de-energizes the first multiplexer 23 to turn off any input signal supplied to the VTR 1. Since the output multiplexer 25 has not selected the output signal from the VTR 1, the output signal from the VTR 1 is supplied only to the second multiplexer 24.

In the operation sequence shown in FIG. 8, if the VTR 1 is in the recording mode in the step $STP_3$, then control goes from the step $STP_3$ to the step $STP_6$ in which the microcomputer 22 controls the first multiplexer 23 to select an output signal from the VTR 2. At the same time, the microcomputer 22 controls the output multiplexer 25 to select an output signal from the VTR 1 for supply to the display monitor 26. Control also goes from the step $STP_3$ to the step $STP_7$ in which the microcomputer 22 de-energizes the second multiplexer 24 to turn off any input signal supplied to the VTR 2. Since the output multiplexer 25 has not selected the output signal from the VTR 2, the output signal from the VTR 2 is supplied only to the first multiplexer 23.

Since the cassettes A, B are not rewound in the dubbing mode, recorded information starts being dubbed from the magnetic tape in one of the cassettes A, B at the last tape position that has been reached in the VTR 1 or the VTR 2.

The time delay between the recording and playback modes in the steps $ST_8$, $ST_{10}$ is inserted in view of the length of a leader tape of the cassette A or B.

The other details of the operation sequences shown in FIGS. 7 and 8 are identical to those shown in FIGS. 5 and 6, respectively.

In FIGS. 5 through 8, the steps ST3, STP3 may be omitted because the edit direction key 17 has already been pressed in the step ST1 to place the VTR 1 or the VTR 2 in the recording mode.

In FIG. 2, the edit direction key 17 is pressed once or twice to indicate the direction in which to dub recorded information from one of the cassettes A, B to the other. Alternatively, the front panel 1 may have two edit direction keys each for indicating one direction in which to dub recorded information when pressed. For example, one of the edit direction keys may bear a marking "A→B" which is highlighted when pressed, and the other edit direction key may bear a marking "A←B" which is highlighted when pressed.

Figure 9:
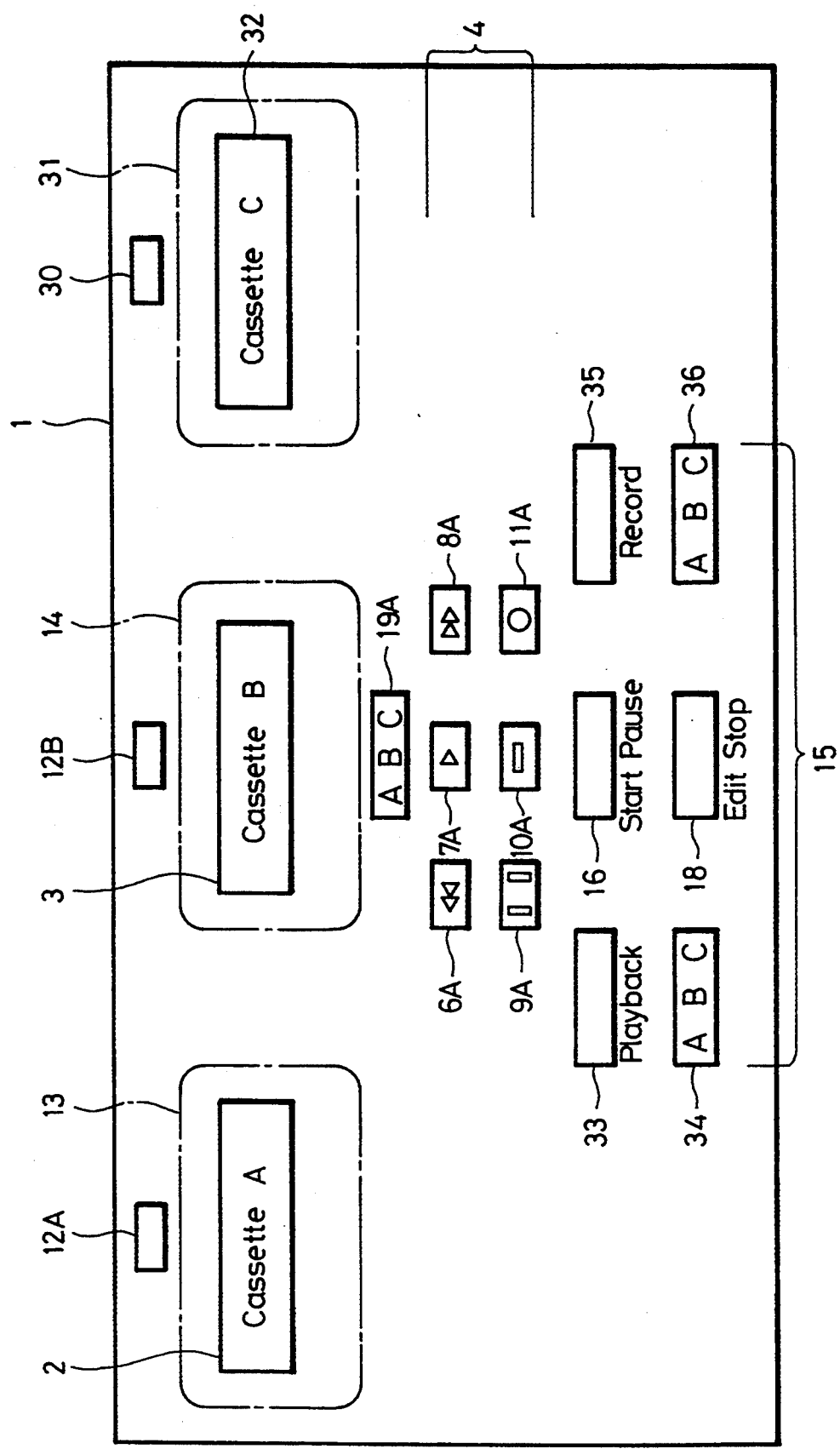
FIG. 9 is a front elevational view of the front panel of a housing of a triple-deck video tape recorder according to still another embodiment of the present invention.

FIG. 9 shows the front panel, designated by the reference numeral 1, of a housing of a triple-deck video tape recorder according to still another embodiment of the present invention.

In FIG. 9, the housing accommodates first, second, and third drive mechanisms 13, 14, 31 for recording information on and reproducing information from respective video tape cassettes A, B, C which have been inserted respectively through tape cassettes slots 2, 3, 32 defined in the front panel 1.

The front panel 1 has a selector key 19A positioned beneath the second tape cassette slot 3 for selecting one, at a time, of the first, second, and third drive mechanisms 13, 14, 31 for playback and recording modes of operation, for example. The front panel 1 also has a first group 4 of control keys below the second tape cassette slot 3, the control keys including a rewind key 6A, a playback key 7A, a fast-forward key 8A, a pause key 9A, a stop key 10A, and a record key 11A, as with the first embodiment described above.

Eject keys 12A, 12B, 13 are positioned above the respective tape cassette slots 2, 3, 32 for ejecting the cassettes A, B, C from the tape cassette slots 2, 3, 32, respectively.

The control panel 1 also has a second group 15 of dubbing keys which include a start/pause key 16 and an edit stop key 18 which are the same as the keys 16, 18 on the control panel 1 shown in FIG. 2. The second group 15 of dubbing keys is used to operate the double-deck magnetic tape recorder in an edit mode, i.e., a dubbing mode.

The second group 15 of dubbing keys also includes a playback key 33 for placing a selected one of the cassettes A, B, C in the playback mode, a record key 35 for placing a selected one of the cassettes A, C, B in the recording mode, a first cassette selector key 34 for selecting one, at a time, of the cassettes A, B, C for the playback mode, and a second cassette selector key 36 for selecting one, at a time, of the cassettes A, B, C for the recording mode. When each of the first and second cassette selector keys 34, 36 is pressed once, twice, and three times, it is illuminated by its own light source to highlight marked letters "A", "B", "C", respectively.

When the cassettes A, B, C are simultaneously inserted in the first, second, and third drive mechanisms 13, 14, 31, various combinations are available of the playback and recording modes for the cassettes A, B, C. For example, the cassettes A, B, C can be placed in the playback and recording modes in the following combinations:

1. Cassette A=playback mode, Cassette B=recording mode;
2. Cassette A=playback mode, Cassette C=recording mode;
3. Cassette A=playback mode, Cassettes B, C=recording mode;
4. Cassettes A, B=playback mode, Cassette C=recording mode;
5. Cassette B=playback mode, Cassette A=recording mode;
6. Cassette B=playback mode, Cassette C=recording mode;
7. Cassette B=playback mode, Cassettes A, C=recording mode;
8. Cassettes B, C=playback mode, Cassette A=recording mode;
9. Cassette C=playback mode, Cassette A=recording mode;
10. Cassette C=playback mode, Cassette B=recording mode;
11. Cassette C=playback mode, Cassettes A, B=recording mode; and
12. Cassettes C, A=playback mode, Cassette B=recording mode.

In the combinations 3, 7, and 11, the recorded information can be dubbed from one cassette to two cassettes simultaneously.

The dubbing keys of the second group 15 may be pressed as follows: To dub recorded information from the cassette B to the cassette C while playing back the cassette A for reproduction on the display monitor, the playback key 33 is pressed and the first cassette selector key 34 is pressed twice. The letter "B" on the first cassette selector key 34 is now highlighted, and the second drive mechanism 14 in which the cassette B is inserted is placed in the playback mode.

Then, the record key 35 is pressed and the second cassette selector key 36 is pressed three times. The letter "C" on the second cassette selector key 36 is now highlighted, and the third drive mechanism 31 in which the cassette C is inserted is placed in the recording mode.

Now, the start/pause key 16 is pressed to start operating the second drive mechanism 14 in the playback mode and the third drive mechanism 31 in the recording mode. Consequently, recorded information is dubbed from the cassette B to the cassette C.

At the same time, the selector key 19A is pressed once to select the first drive mechanism 13, and then the playback key 7A is pressed to start playing back the cassette A inserted in the first drive mechanism 13. Therefore, information recorded in the cassette A is reproduced on the display monitor.

As a consequence, any information recorded in one or more cassettes can be dubbed to one or more cassettes in a highly simplified manner.

While the multiple-deck video tape recorders have been shown and described above in the above embodiments, the principles of the present invention are also applicable to multiple-deck audio tape recorders and other multiple-deck magnetic information recorders including multiple-disk magnetic information recorders.

Having described preferred embodiments of the invention with reference to the accompanying drawings, it is to be understood that the invention is not limited to that precise embodiments and that various changes and modifications could be effected by one skilled in the art without departing from the spirit or scope of the invention as defined in the appended claims.

What is claimed is:

1. A multiple-deck magnetic information recording and reproducing apparatus comprising:

a housing having a plurality of slots for inserting and ejecting respective magnetic recording mediums therethrough;

a plurality of drive mechanisms disposed in said housing for recording information on and reproducing information from the magnetic recording mediums inserted in the respective drive mechanisms through said slots;

control means for placing one of said drive mechanisms in a playback mode and another of said drive mechanisms in a recording mode in response to a first input signal from a first control key, and for starting to operate said one drive mechanism to reproduce recorded information from the magnetic recording medium inserted therein and to operate said other drive mechanism to record the reproduced information on the magnetic recording medium inserted therein, in response to an input signal from a second control key; and said control means further comprises means for changing sad one of said drive mechanisms from said playback mode to a record mode and changing said another of said drive mechanisms from said recording mode to a playback mode all in response to a second input signal from said first control key.

2. A multiple-deck magnetic information recording and reproducing apparatus according to claim 1, wherein said control means includes means for returning the magnetic recording mediums inserted in said one and other drive mechanisms back to start positions thereof before said one and other drive mechanisms start to operate.

3. A multiple-deck magnetic information recording and reproducing apparatus according to claim 1, wherein said control means includes means for starting to operate said one drive mechanism a predetermined period of time after said other drive mechanism starts operating.

4. A multiple-deck magnetic information recording and reproducing apparatus according to claim 1, wherein said magnetic recording mediums comprise magnetic tape cassettes.

5. A multiple-deck magnetic information recording and reproducing apparatus comprising:

a housing having a plurality of slots for inserting and ejecting respective magnetic recording mediums therethrough;

a plurality of drive mechanisms disposed in said housing for recording information on and reproducing information from the magnetic recording mediums inserted in the respective drive mechanisms through said slots;

control means for placing one of said drive mechanisms in a playback mode and another of said drive mechanisms in a recording mode in response to a first input signal from a first control key, and for starting to operate said one drive mechanism to reproduce recorded information from the magnetic recording medium inserted therein and to operate said other drive mechanism to record the reproduced information on the magnetic recording medium inserted therein, in response to an input sisal from a second control key;

said control means further comprises means for changing said one of said drive mechanisms from said playback mode to a record mode and changing said another of said drive mechanisms from said recording mode to a playback mode all in response to a second input signal from said first control key; and indicator means responsive to said first and second signals from said first control key to indicate which of said drive mechanisms is placed in said, playback mode and which of said drive mechanisms is placed in said recording mode.

6. A multiple-deck magnetic information recording and reproducing apparatus according to claim 5, wherein said control means includes means for returning the magnetic recording mediums inserted in said one and other drive mechanisms back to start positions thereof before said one and other drive mechanisms start to operate.

7. A multiple-deck magnetic information recording and reproducing apparatus according to claim 5, wherein said control means includes means for starting to operate said one drive mechanism a predetermined period of time after said other drive mechanism starts operating.

8. A multiple-deck magnetic information recording and reproducing apparatus according to claim 5, wherein said magnetic recording mediums comprise magnetic tape cassettes.

9. A multiple-deck magnetic information recording and reproducing apparatus comprising:

a housing having a plurality of slots for inserting and ejecting respective magnetic recording mediums therethrough; and a plurality of drive mechanisms disposed in said housing for recording information on and reproducing information from the magnetic recording mediums inserted in the respective drive mechanisms through said slots;

control means for placing one of said drive mechanisms in a playback mode and another of said drive mechanisms in a recording mode in response to a first input signal from a first control key, and for starting to operate said one drive mechanism to reproduce recorded information from the magnetic recording medium inserted therein and to operate said other drive mechanism to record the reproduced information on the magnetic recording medium inserted therein, in response to an input signal from a second control key;

said control means further comprises means for changing said one of said drive mechanisms from said playback mode to a record mode and changing said another of said drive mechanisms from said recording mode to a playback mode all in response to a second input signal from said first control key;

indicator means responsive to said first and second input signals from said first control key to indicate which of said drive mechanisms is placed in said playback mode and which of said drive mechanisms is placed in said recording mode;

said control means further comprises:

means for returning the magnetic recording mediums inserted in said one and other drive mechanisms back to start positions thereof before said one and other drive mechanisms start to operate;

means for starting to operate said one drive mechanism a predetermined period of time after said other drive mechanism starts operating;

said magnetic recording mediums comprise magnetic tape cassettes;

said one of said drive mechanisms comprises a VHS format video tape deck; and said other of said drive mechanisms comprises an 8 mm format video tape deck.

* * * * *